(12) United States Patent
Kiesler

(10) Patent No.: US 10,625,346 B2
(45) Date of Patent: Apr. 21, 2020

(54) ADJUSTABLE PIPE CENTER AND METHOD

(71) Applicant: Barry Kiesler, New Salisbury, IN (US)

(72) Inventor: Barry Kiesler, New Salisbury, IN (US)

( * ) Notice: Subject to any disclaimer, the term of this patent is extended or adjusted under 35 U.S.C. 154(b) by 0 days.

(21) Appl. No.: 16/101,124

(22) Filed: Aug. 10, 2018

(65) Prior Publication Data
US 2019/0047053 A1 Feb. 14, 2019

Related U.S. Application Data

(60) Provisional application No. 62/543,655, filed on Aug. 10, 2017.

(51) Int. Cl.
*B23B 23/02* (2006.01)
*B23B 23/04* (2006.01)

(52) U.S. Cl.
CPC .......... *B23B 23/025* (2013.01); *B23B 23/045* (2013.01); *B23B 2222/84* (2013.01); *B23B 2233/20* (2013.01)

(58) Field of Classification Search
CPC ... B23B 23/005; B23B 23/025; B23B 23/045; B23B 23/00; B23B 23/02; B23B 23/04; B23B 2233/12; B23B 2233/20; B23B 2233/24; B23B 2233/28; Y10T 82/2568; Y10T 82/2571; Y10T 82/27
See application file for complete search history.

(56) References Cited

U.S. PATENT DOCUMENTS

| | | | | | |
|---|---|---|---|---|---|
| 249,143 | A | * | 11/1881 | Cottrell | B23B 31/025 82/168 |
| 412,926 | A | * | 10/1889 | Knight | B23B 23/04 82/150 |
| 493,119 | A | * | 3/1893 | Roe | B23B 23/04 82/150 |
| 1,252,274 | A | * | 1/1918 | Lingo | B23B 31/025 82/150 |
| 1,491,332 | A | * | 4/1924 | Brown | B23B 23/02 279/123 |
| 1,527,866 | A | * | 2/1925 | Hall | B23B 31/4046 279/2.12 |

(Continued)

FOREIGN PATENT DOCUMENTS

| DE | 19618036 A1 | * | 11/1996 | ........... B23B 23/025 |
| SU | 795727 A2 | * | 1/1981 | ............. B23B 23/04 |

*Primary Examiner* — Ryan C Rufo
(74) *Attorney, Agent, or Firm* — Charles Runyan

(57) ABSTRACT

An adjustable pipe center; the lathe-center may be useful for supporting the end of a rotating workpiece having a hollow along an axis upon which the workpiece is rotating. The adjustable pipe center includes a shaft, a center-head having keyways, a plurality of bearing-fins, and a plurality of power-screws. The center-head is fixed to the shaft and is able to fit within the hollow of the workpiece. The plurality of bearing-fins is able to fit and slide within the keyways, with each having a bearing-surface for contacting the workpiece. The bearing-surface is disposed at an angle to the shaft-axis between zero and ninety degrees. The bearing-fins may be translated, functioning as an inclined plane to displace a workpiece resting against it. When the bearing-fins are collectively translated as desired, it may laterally adjust the position of the workpiece-axis relative to the shaft-axis.

13 Claims, 5 Drawing Sheets

(56) References Cited

U.S. PATENT DOCUMENTS

| | | | | |
|---|---|---|---|---|
| 2,247,721 A | * | 7/1941 | Wright | B23B 23/025 82/151 |
| 2,362,812 A | * | 11/1944 | Fouchey | B23B 23/04 82/150 |
| 2,559,950 A | * | 7/1951 | Davis | B23B 5/16 279/66 |
| 2,701,978 A | * | 2/1955 | Lee | B23B 23/04 279/158 |
| 3,129,950 A | * | 4/1964 | Galler | B23B 31/36 279/143 |
| 3,308,696 A | * | 3/1967 | La Marca | B23B 23/045 82/150 |
| 3,630,112 A | * | 12/1971 | Sudholt | B23B 23/045 82/150 |
| 4,151,767 A | * | 5/1979 | Szush, Jr. | B23B 23/04 82/150 |
| 4,869,140 A | | 9/1989 | Alexander | |
| 5,957,017 A | * | 9/1999 | Andronica | B23B 23/02 82/150 |

\* cited by examiner

ADJUSTABLE PIPE CENTER AND METHOD

CROSS-REFERENCE TO RELATED APPLICATION(S)

The present application is related to and claims priority to U.S. Provisional Patent Application No. 62/543,655 filed Aug. 10, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of machining technology of existing art and more specifically relates to a lathe center.

RELATED ART

A lathe center, often referred to simply as a center, is a tool that is used to accurately position a workpiece on an axis and stabilize the work piece to be cut at the tailstock. The primary purpose of a center is to ensure concentric work is produced and to eliminate deflection resulting from the pressure exerted on the workpiece while cutting. This allows the workpiece to be rigid and concentric for an accurate and precise turning operation.

Inaccurate centering of the work piece produces runout, which is the rotation of the work piece on an axis deviating from that of the rotation of the machine. Runout is one of the problems a machinist must eliminate during a turning operation. In particular, runout becomes increasingly problematic while working with a long work piece extending far from the lathe chuck, as minimal changes in the axis of the workpiece can produce large deviations at the end opposite the lathe chuck. Runout will lead to poor accuracy and incorrect parts, making a product of the machining process unusable. Machined components usually demand a high degree of precision, so virtually any detectable runout is unacceptable. A suitable solution is desired.

U.S. Pat. No. 4,869,140 to Billy R. Alexander relates to an adjustable precision live center for use with a lathe. The described adjustable precision live center for use with a lathe include a spindle housing slidably interlocking with a shank block by operation of a dovetail tenon mated to a dovetail mortise of the shank block. A spindle is rotatably coupled to the spindle housing, extending rearward through the dovetail tenon of the spindle housing. Precision adjustment of the spindle housing relative to the shank block is made possible by an adjustment bolt.

SUMMARY OF THE INVENTION

In view of the foregoing disadvantages inherent in the known lathe center art, the present disclosure provides a novel adjustable pipe center and method. The general purpose of the present disclosure, which will be described subsequently in greater detail, is to provide an adjustable pipe center and method.

An adjustable pipe center is disclosed herein. The adjustable pipe center may be useful for supporting the end of a rotating workpiece having a hollow along an axis upon which the workpiece is rotating. The adjustable pipe center includes a shaft, a center-head, a plurality of bearing-fins, and a plurality of power-screws. The shaft is able to couple to a lathe-spindle or tailstock axially to the shaft. The center-head is fixed to the shaft and is able to fit within the hollow of the workpiece. The center-base may itself include a center-base, a center-end, a conical sidewall, a plurality of screw-apertures, and a plurality of keyways. The center-base and center-end are concentric, with the center-base being larger than the center-end. The center-base is adjacent to the shaft, while the center-end is distal to the shaft. The conical sidewall extends between the center-base and the center-end. The adjustable pipe center may have precision bearings for a rotating live center for use in the tailstock of a lathe or a non-rotating dead center for use in the lathe spindle or lathe chuck.

The plurality of screw-apertures extend(s) from the center-base to the center-end within the center-head, while the plurality of keyways are recessed into the conical wall. The bearing-fins are able to fit and slide within the keyways, and each themselves include a bearing-surface, a retention-flange, a concavity, and a fin-threading. The bearing-surface is disposed distally to the keyways and the center-head and are able to engage and collectively support the hollow of the workpiece when the workpiece is placed against the lathe-center. The bearing-surface is disposed at an angle to the shaft-axis between zero and ninety degrees. The retention-flange is distal to the bearing-surface and has a shape corresponding to the keyways, such that the retention-flange may slide within and be retained by the keyways, such that the bearing-fins are unable to move radially outwardly from the keyways. The concavity is relieved into the retention-flange and is semi-circular, and the fin-threading is cut into the concavity.

The plurality of power-screws corresponds to the plurality of bearing fins, such that there is one power-screw for each bearing-fin. The power-screws are dimensioned to fit and turn freely within the screw-apertures. When assembled within the center-head, each power screw is in engagement with a bearing-fin, and more specifically with the fin-threading. In this assembled condition, when the power-screw is turned, it engages the fin-threading and causes the bearing-fin to slide linearly within the keyway and axially to the power-screw. Each power-screw rotates on a drive-axis which is neither parallel nor normal to the bearing-surface of the corresponding bearing-fin. Thereby, when each bearing-fin translates, it acts as an inclined plane to displace a workpiece resting against it. When the bearing-fins are collectively translated as desired, they may laterally adjust the position of the workpiece-axis relative to the shaft-axis.

According to another embodiment, a method of use for eliminating runout during a lathe operation is also disclosed herein. The method of use for eliminating runout during a lathe operation includes providing the above-described lathe-center, affixing the shaft to a lathe-spindle, turning a first of the plurality of power-screws to adjust the lateral position of a corresponding one of the plurality of bearing-fins relative to a workpiece, subsequently turning another of the plurality of power-screws to adjust the lateral position of a corresponding one of the plurality of bearing-fins relative to a workpiece, until as many power-screws as are desired have been adjusted, placing the center within a hollow of the workpiece, such that the hollow of the workpiece engages the plurality of bearing-fins, and rotating the workpiece as the workpiece is supported by the center.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an adjustable pipe center and method, constructed and operative according to the teachings of the present disclosure.

The various embodiments of the present invention will hereinafter be described in conjunction with the appended drawings, wherein like designations denote like elements.

DETAILED DESCRIPTION

Figure 1:
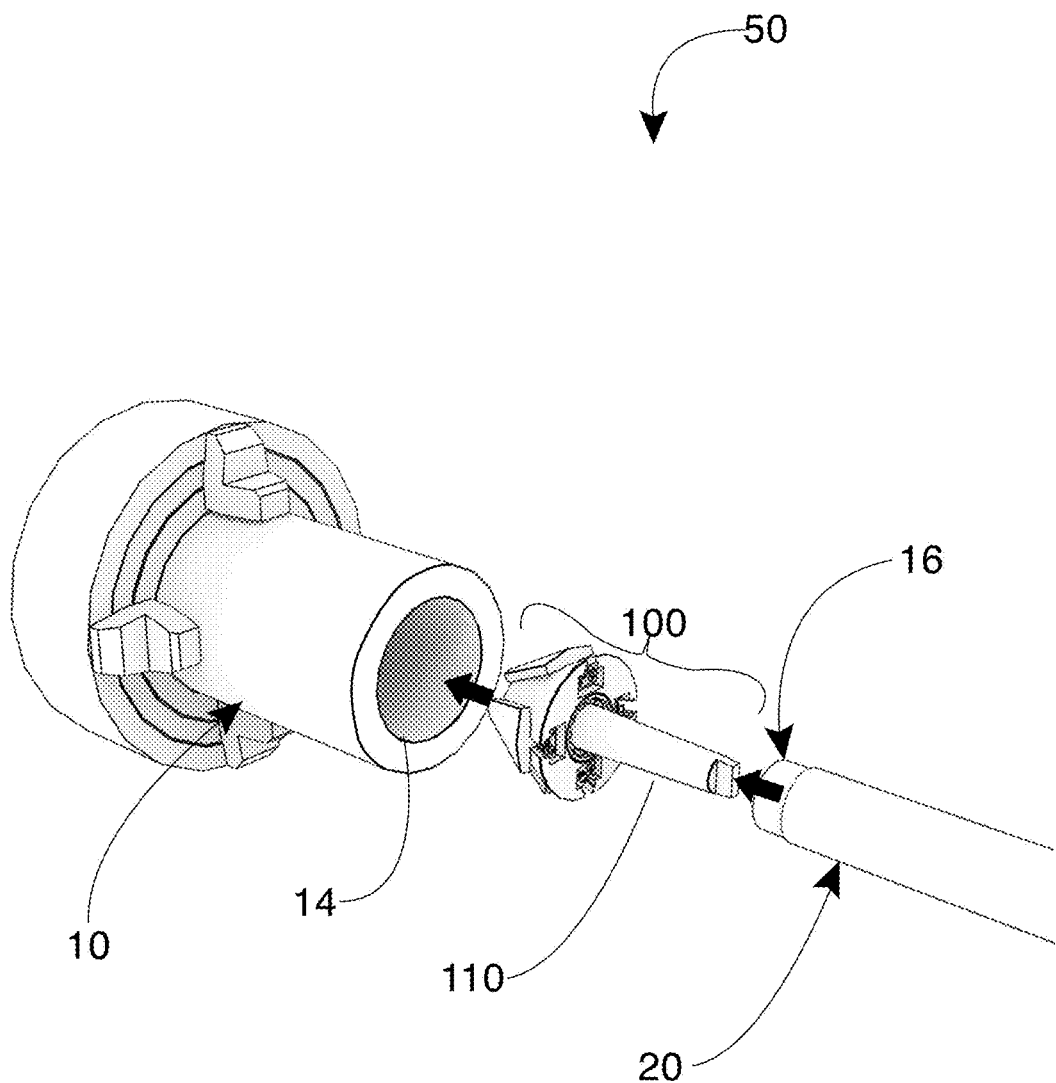
FIG. 1 is a perspective view of the adjustable pipe center during an 'in-use' condition, according to an embodiment of the disclosure.

As discussed above, embodiments of the present disclosure relate to a lathe center and more particularly to an adjustable pipe center and method as used to improve the elimination of runout during a lathe operation.

Generally, the adjustable pipe center functions as an adjustable machining center, particularly for use with hollow work pieces. It attaches in the tailstock or spindle of a lathe in order to support a rotating work piece during a machining operation. This allows machinists and machine operators to minimize run-out of parts to be machined in a metal lathe buy adjusting the position of the center relative to the lathe chuck in which the work piece is affixed. The present invention includes a multitude of angled fins that are modifiable in such a way that the turning center of the device may be precisely located.

The adjustable pipe center may be a conically-shaped hardened steel adjustable live center that can be inserted in the tailstock of a metal lathe or an adjustable dead center that can be inserted in the headstock of a metal lathe for turning hollow workpieces, including pipe and tubing. The head of the center may be conical and may have a plurality of independently adjustable angled bearing-fins attached to the tapered face of the center. The bearing-fins may be slidably adjusted in a way such that each bearing-fin moves back and forth along the longitudinal axis of the center, the longitudinal axis being the same as the rotational axis of the lathe. Each bearing-fin may be movable on its own axis and may have an exterior bearing surface for contacting the workpiece, which is non-parallel to the axis which the bearing-fin moves on. In this way, each bearing-fin may function as an inclined place to alter the position at which the bearing-fin and the work piece contact as the bearing-fin is adjusted. Each bearing-fin may include a threaded surface which engages a fixed worm-drive type screw, or power-screw. When the corresponding power-screw is turning, the fin slides within a channel or keyway. The exact specifications may vary depending on the workpiece and lathe size.

In some embodiments, each keyway may further include a guideway, a bearing-shoulder, and a retention-keyway. The guideway may be dimensioned and positioned to index the bearing-fins tangentially about the center-head, preventing each of the bearing-fins from diverging laterally from each corresponding one of the keyways. The bearing-shoulder may be dimensioned and positioned to index the bearing-fins radially about the center-head by preventing the bearing-fins from moving in an inwardly radial direction relative to the center-head. The bearing-shoulder may be sufficiently displaced from its corresponding power-screw to prevent compression against the power-screw by the workpiece when the workpiece is in contact with the bearing-fins. The retention-keyway may be configured to engage the retention-flange of the plurality of bearing-fins, being sufficiently proximate to the corresponding power-screw to index the fin-threading of the bearing-fin to the power-screw.

Referring now more specifically to the drawings by numerals of reference, there is shown in FIGS. 1-4B, various views of a lathe center 100.

FIG. 1 shows a lathe center 100 during an 'in-use' condition 50, according to an embodiment of the present disclosure. Here, the lathe center 100 may be beneficial to eliminate runout during a lathe operation. As illustrated, the lathe center 100 may be useful for centering workpiece 10 having hollow 14 and workpiece-axis 16. Lathe center 100 may be inserted into hollow 14 of workpiece 10. Lathe center 100 may be rigidly mounted within lathe-spindle 20. Lathe center 100 may include shaft 110, which may be insertable into lathe-spindle 20. Upon reading this specification, it should be appreciated that, under appropriate circumstances, considering such issues as user preferences, design preference, structural requirements, marketing preferences, cost, available materials, technological advances, etc., other structural arrangements such as, for example, additional fins, alternative fin contours and angles, alternative shaft designs, etc., may be sufficient.

Those with ordinary skill in the art will now appreciate that upon reading this specification and by their understanding the art of machining as described herein, methods of using a center with a lathe will be understood by those knowledgeable in such art.

According to one embodiment, the lathe center 100 may be arranged as a kit 105. In particular, the lathe center 100 may further include a set of instructions 107. The instructions 107 may detail functional relationships in relation to the structure of the lathe center 100 such that the lathe center 100 can be used, maintained, or the like, in a preferred manner.

Figure 2:
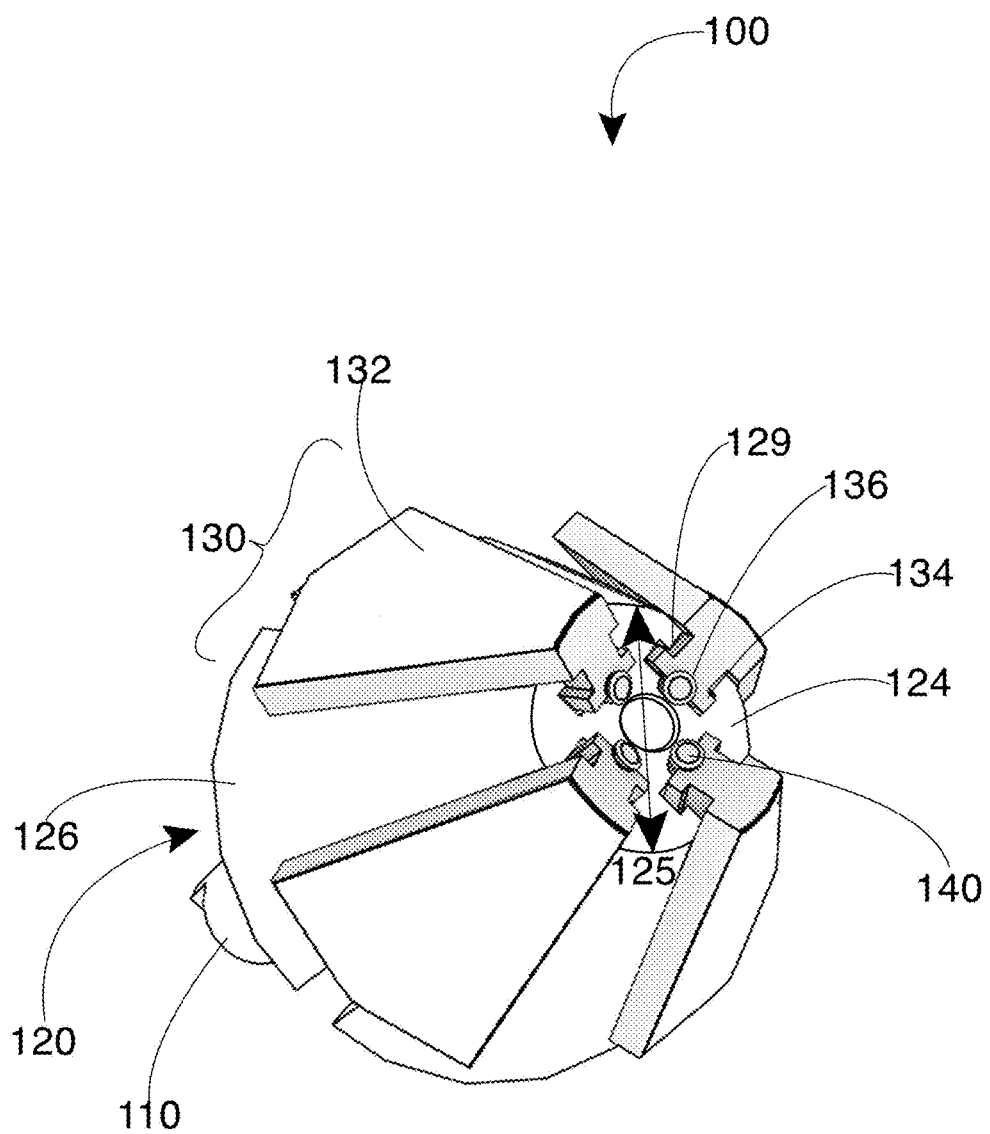
FIG. 2 is a top perspective view of the adjustable pipe center of FIG. 1, according to an embodiment of the present disclosure.

FIG. 2 shows the lathe center 100 of FIG. 1, according to an embodiment of the present disclosure. Lathe-center 100 may include shaft 100, center-head 120, plurality of bearing-fins 130, and plurality of power-screws 140. Center-head 120 fixed to shaft 110, and in some embodiments may be permanently or removably attached to shaft 110. Center-head 120 may be configured to fit within hollow 14 (FIG. 1) of workpiece 10 (FIG. 1). Center-head 120 may include center-end 124 and conical sidewall 126. Center-end 124 may be disposed distal to and concentric with shaft 110 and may be substantially circular in shape. Center-end 124 may comprise a flat face. Center-end may have and may be defined by end-diameter 125. Plurality of bearing-fins 130 may be removably disposed within center-head 120 and may be able to slide within center-head 120. Each of plurality of bearing-fins 130 may include bearing-surface 132, retention-flange 134, and concavity 136. Bearing-surface 132 may be disposed distally to center-head 120 and may be configured to engage hollow 14 (FIG. 1) of workpiece 10 (FIG. 1). Retention-flange 134 may be disposed distally to bearing-surface 132 and may be structured and arranged to engage plurality of keyways 129. Retention-flange 134 may be able to prevent plurality of bearing-fins 130 from moving radially outward from within plurality of keyways 129. Concavity 136 may be disposed within and may be integral to retention-flange 134. Concavity 136 may be semi-circular.

Figure 3:
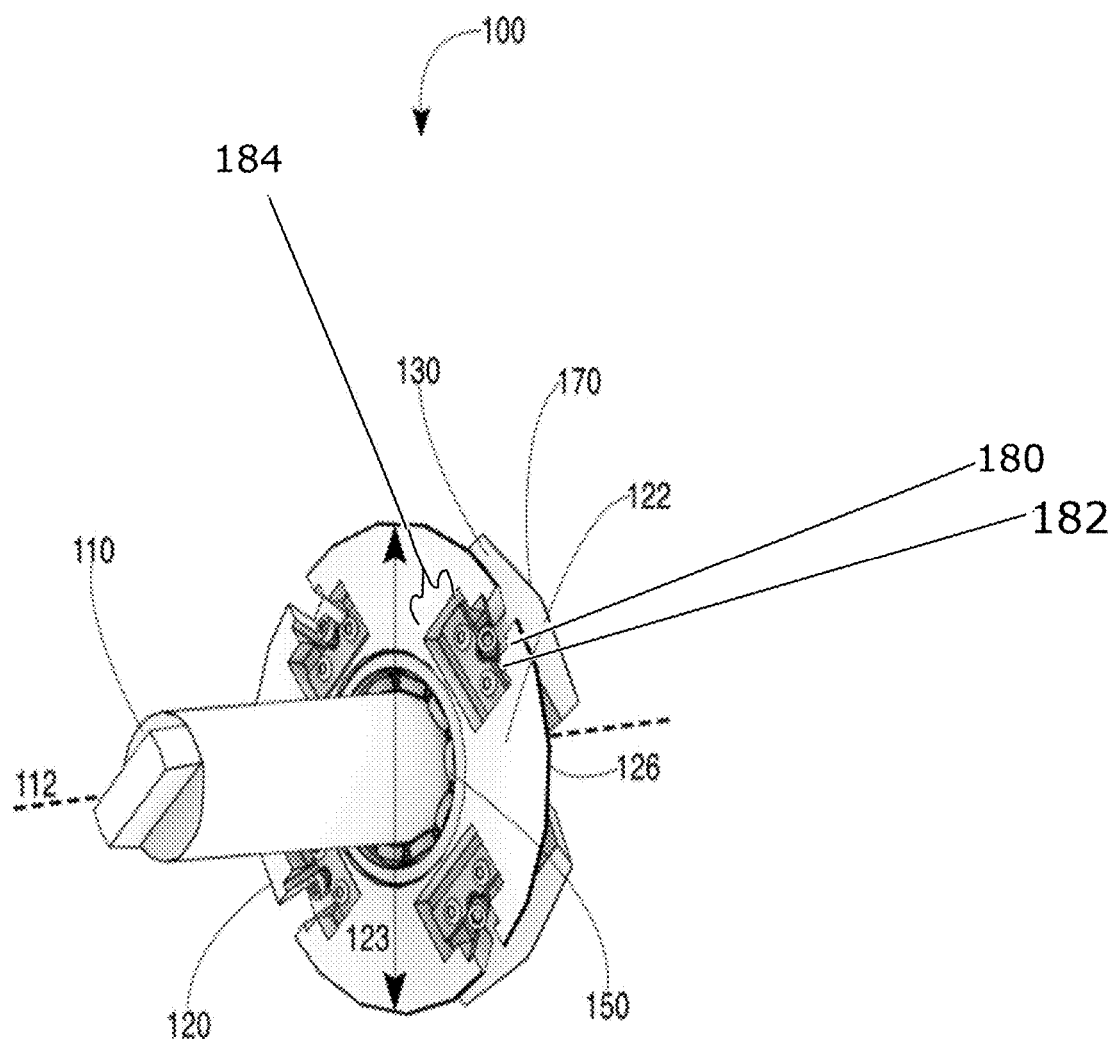
FIG. 3 is a bottom perspective view of the adjustable pipe center of FIG. 1, according to an embodiment of the present disclosure.

Referring now to FIG. 3, a perspective view of the adjustable pipe center of FIG. 1, according to an embodiment of the present disclosure. Shaft 110 may have shaft-axis 112 and may be configured to releasably couple with lathe-spindle 20 (FIG. 1). In some embodiments, shaft 110 may have a machine-taper configured to mate with a machine-tapered spindle. Center-base 122 may be proximal to and concentric with shaft 110. Center-base 122 may also be circular and may be defined by base-diameter 123. In a preferred embodiment, base-diameter 123 is larger than end-diameter 125 (FIG. 2). Conical sidewall 126 may extend between center-base 122 and center-end 124 (FIG. 2). According, conical sidewall 126 may be tapered, such that center-head 120 is conical. Plurality of bearing-fins 130 may be constructed from hardened tool-steel and may be configured to bear against a turning workpiece 10 (FIG. 1). Bearing-surface 132 (FIG. 2) of plurality of bearing-fins 130 may have convex surface-curvature 170 contoured to mate with hollow 14 (FIG. 1) of workpiece 10 (FIG. 1). Preferably, bearing-surface 132 (FIG. 2) is neither parallel nor normal to shaft-axis 112. Lathe-center 100 may further include bearing 150. Bearing 150 may couple shaft 110 to center-head 120, thereby enabling shaft 110 to spin freely relative to shaft 110. Bearing 150 may be disposed within and concentric to center-base 122 of center-head 120. In some embodiments, each keyway may further include guideway 180, bearing-shoulder 182, and retention-keyway 184.

Figure 4A:
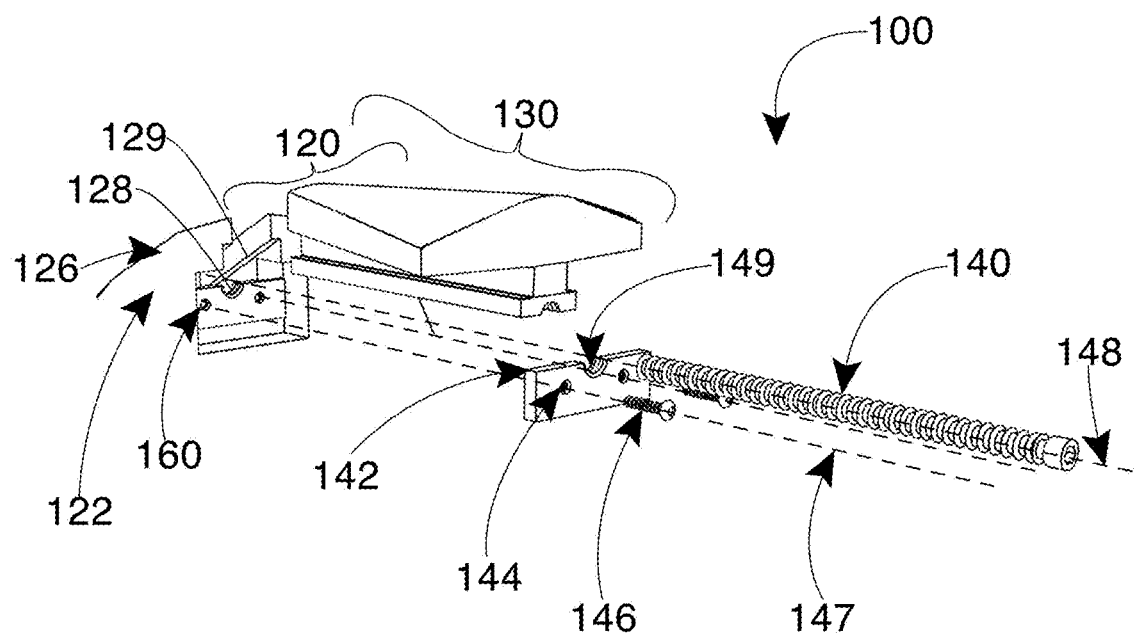
FIG. 4A is an exploded view of the adjustable pipe center of FIG. 1, according to an embodiment of the present disclosure.

FIG. 4A is an exploded view of the adjustable pipe center of FIG. 1, according to an embodiment of the present disclosure. Center-head 120 may further include plurality of screw-apertures 128. As illustrated, plurality of keyways 129 may be recessed into conical sidewall 126. Plurality of keyways 129 may be "T"-shaped as shown. Plurality of power-screws 140 may correspond to plurality of bearing-fins 130 and may be able to be removably disposed within plurality of screw-apertures 128. Plurality of power-screws 140 may be sized to freely turn within plurality of screw-apertures 128. Preferably, plurality of screw-apertures 128 are smooth-walled. Plurality of power-screws 140 may be in engagement with fin-threading 138 of plurality of bearing-fins 130 when installed within plurality of screw-apertures 128, such that turning one of plurality of power-screws 140 causes a corresponding one of plurality of bearing-fins 130 to slide linearly within a corresponding one of plurality of keyways 129. Plurality of screw-apertures 128 may perforate center-head 120 and may extend from center-base 122 to center-end 124 (FIG. 2), such that plurality of screw-apertures penetrates both center-base 122 and center-end 124 (FIG. 2).

Plurality of bearing-fins 130 may be able to be disposed within plurality of keyways 129 alongside plurality of power-screws 140. Plurality of bearing-fins 130 may be able to slide freely within plurality of keyways 129 until engaged by plurality of power-screws 140. When both plurality of bearing-fins 130 and plurality of power-screws 140 are installed within center-head 120, each of plurality of bearing-fins 130 may only be able to slide within plurality of keyways 129 when a corresponding one of plurality of power-screws 140 is turned. Thereby, lateral motion of plurality of bearing-fins 130 may be restricted by plurality of power-screws 140, while being simultaneously constrained to a single axis of motion by plurality of keyways 129. Lathe-center 100 may further include plurality of screw-retainers 142. Plurality of screw-retainers 142 may correspond to plurality of power-screws 140 and may be able to be affixed to center-base 122 over plurality of screw-apertures 128, such that one each of plurality of screw-retainers 142 covers one each of plurality of screw-apertures 128. Each of plurality of screw-apertures 128 may be disposed parallel to conical sidewall 126 in some embodiments. Each of plurality of screw-apertures 128 may also be smooth-walled, the plurality of screw-apertures being configured to allow plurality of power-screws 140 to freely spin within plurality of screw-apertures 128.

Plurality of screw-retainers 142 may prevent plurality of power-screws 140 from leaving plurality of screw-apertures 128 when plurality of power-screws 140 and plurality of screw-retainers 142 are installed into center-head 120. Plurality of screw-retainers 142 may each include at least one retainer-aperture 144 and at least one retainer-screw 146. At least one retainer-screw 146 may be dimensioned to pass through at least one retainer-aperture 144 into center-base 122, such that plurality of screw-retainers 142 is releasably affixed to center-head 120. Center-head 120 may further include plurality of base-apertures 160 disposed within center-base 122. Center-head 120 may be dimensioned and threaded to releasably accept at least one retainer-screw 146. Each of plurality of power-screws 140 may have power-screw axis 148 along which each of plurality of power-screws 140 rotates.

Power-screw axis 148 may be disposed at an angle intermediate to shaft-axis 112 (FIG. 3) and bearing-surface 132 (FIG. 2), such that rotating one of plurality of power-screws 140 causes the corresponding one of bearing-surface 132 (FIG. 2) to move inwardly and alternatively outwardly against hollow 14 (FIG. 1) of workpiece 10 (FIG. 1) when workpiece 10 (FIG. 1) is supported by lathe-center 100, each of bearing-surface 132 functioning as an inclined plane. Each of at least one retainer-screws 146 may have retainer-screw axis 147 along which each of at least one retainer-screws 146 rotates. In some embodiments retainer-screw axis 147 may be parallel to each of plurality of power-screws 140. Each of plurality of screw-retainers 142 may further include semi-circular relief 149.

Semi-circular relief 149 may be configured to engage and retain each of plurality of power-screws 140 while also exposing an end of each of plurality of power-screws 140, such that each of plurality of power-screws 140 may be engaged by a drive tool while being retained by plurality of screw-retainers 142. Semi-circular relief 149 may be alignable and concentric to plurality of power-screws 140. In a preferred embodiment, plurality of power-screws 140 may be hex-drive screws each having a hexagonal aperture concentric to power-screw axis 148 configured to accept a hex-drive tool. In an alternative embodiment, plurality of power-screws 140 may be hexalobular-drive screws each having a hexalobular-internal aperture concentric to power-screw axis 148 configured to accept a hexalobular-drive tool. At least one retainer-screw 146 of plurality of screw-retainers 142 may comprise at least one hex-drive screw having a hexagonal aperture concentric to the retainer-screw configured to accept a hex-drive tool.

Figure 4B:
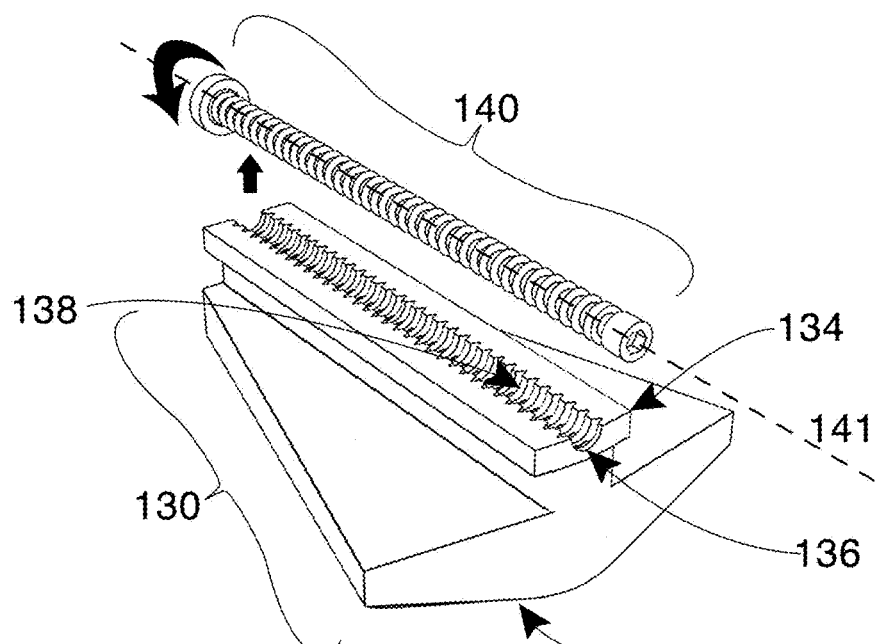
FIG. 4B is an exploded view of the adjustable pipe center of FIG. 1 demonstrating the interaction of the power-screw with the bearing-fin, according to an embodiment of the present disclosure.

FIG. 4B is an exploded view of the adjustable pipe center of FIG. 1 demonstrating the interaction of the power-screw with the bearing-fin, according to an embodiment of the present disclosure. Plurality of power-screws 140 may each have drive-axis 141. Drive-axis 141 may be neither parallel nor normal to bearing-surface 132 of plurality of bearing-fins 130 in order to enable bearing-surface 132 of one of plurality of bearing-fins 130 to function as a translating inclined plane against hollow 14 (FIG. 1) of workpiece 10 (FIG. 1), such that workpiece-axis 16 (FIG. 1) of workpiece 10 (FIG. 1) is displaced laterally relative to shaft-axis 112 (FIG. 3) as any one of retention-flange 134 of plurality of bearing-fins 130 slides linearly within the corresponding one of plurality of keyways 129 (FIG. 4A). Each of plurality of bearing-fins 130 may further include fin-threading 138. Fin-threading 138 may be integrated into concavity 136. Fin-threading 138 may comprise an interrupted thread dimensioned to correspond to and engage each of plurality of power-screws 140.

Figure 5:
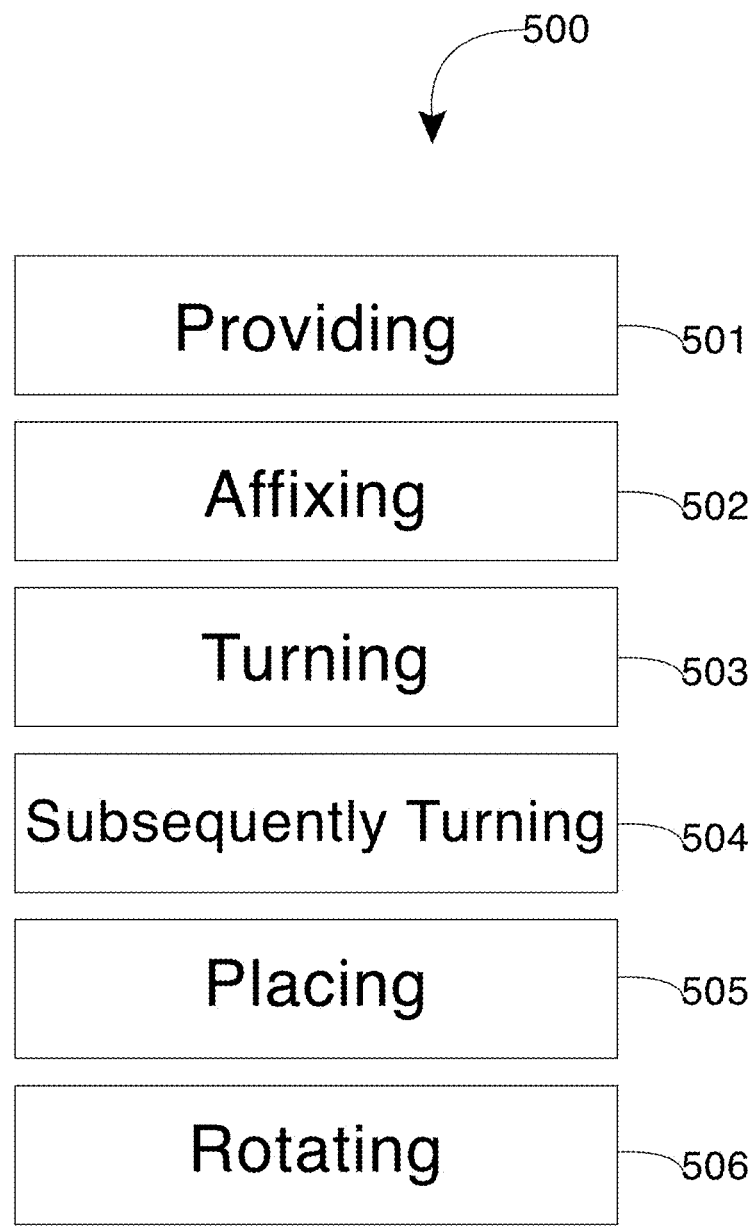
FIG. 5 is a flow diagram illustrating a method of use for eliminating runout during a lathe operation, according to an embodiment of the present disclosure.

FIG. 5 is a flow diagram illustrating a method for eliminating runout during a lathe operation 500, according to an embodiment of the present disclosure. In particular, the method for eliminating runout during a lathe operation 500 may include one or more components or features of the lathe center 100 as described above. As illustrated, the method for eliminating runout during a lathe operation 500 may include the steps of: step one 501, providing a lathe-center comprising: a shaft having a shaft-axis, the shaft configured to releasably couple with a lathe-spindle, a center-head fixed to the shaft, the center-head configured to fit within the hollow of the workpiece, the center-head including a center-base proximal to and concentric with the shaft, the center-base being circular and having a base-diameter, a center-end distal to and concentric with the shaft, the center-end being circular and having an end-diameter, the end-diameter being smaller than the base-diameter, a conical sidewall extending between the center-base and the center-end, a plurality of screw-apertures extending from the center-base to the center-end, and a plurality of keyways recessed into the conical sidewall, a plurality of bearing-fins disposed within the plurality of keyways, the plurality of bearing-fins being able to slide within the plurality of keyways, each of the plurality of bearing-fins having a bearing-surface disposed distal to the center-head configured to engage the hollow of the workpiece, the bearing-surface being neither parallel nor normal to the shaft-axis, a retention-flange distal to the bearing-surface structured and arranged to engage the plurality of keyways, the retention-flange being able to prevent the plurality of bearing-fins from moving radially outward from within the plurality of keyways, a concavity disposed within the retention-flange, the concavity being semi-circular, and a fin-threading integrated into the concavity, and a plurality of power-screws corresponding to the plurality of bearing-fins disposed within the plurality of screw-apertures, the plurality of power-screws being sized to freely turn within the plurality of screw-apertures, the plurality of power-screws being in engagement with the fin-threading of the plurality of bearing-fins, such that turning one of the plurality of power-screws causes a corresponding one of the plurality of bearing-fins to slide linearly within the corresponding one of the plurality of keyways, the plurality of power-screws each having a drive-axis, the drive-axis being neither parallel nor normal to the bearing-surface of the plurality of bearing-fins in order to enable the bearing-surface of one of the plurality of bearing-fins to function as a translating inclined plane against the hollow of the workpiece, such that the workpiece-axis of the workpiece is displaced laterally relative to the shaft-axis as any one of the plurality of bearing-fins slides linearly within the corresponding one of the plurality of keyways; step two 502, affixing the shaft to a lathe-spindle; step three 503, turning a first of the plurality of power-screws to adjust the lateral position of a corresponding one of the plurality of bearing-fins relative to a workpiece; step four 504, subsequently turning another of the plurality of power-screws to adjust the lateral position of a corresponding one of the plurality of bearing-fins relative to a workpiece, until as many power-screws as are desired have been adjusted; step five 505, placing the center within a hollow of the workpiece, such that the hollow of the workpiece engages the plurality of bearing-fins; and step six 506, rotating the workpiece as the workpiece is supported by the center.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for eliminating runout during a lathe operation, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A lathe-center for a workpiece having a hollow and a workpiece-axis, the lathe-center comprising:
   a shaft having a shaft-axis, the shaft configured to releasably couple with a lathe-spindle;
   a center-head fixed to the shaft, the center-head configured to fit within the hollow of the workpiece, the center-head including a center-base proximal to and concentric with the shaft, the center-base being circular and having a base-diameter, a center-end distal to and concentric with the shaft, the center-end being flat and circular with an end-diameter, the end-diameter being smaller than the base-diameter, a conical sidewall extending between the center-base and the center-end, a plurality of screw-apertures extending from the center-base to the center-end, wherein each of the plurality of screw-apertures are disposed parallel to the conical sidewall, and a plurality of keyways recessed into the conical sidewall;

a plurality of bearing-fins respectively disposed within the plurality of keyways, the plurality of bearing-fins being able to slide within the plurality of keyways, each of the plurality of bearing-fins having a bearing-surface disposed distal to the center-head configured to engage the hollow of the workpiece, the bearing-surface being neither parallel nor normal to the shaft-axis, the bearing-surface having a convex surface-curvature structured and arranged to mate with the hollow of the workpiece, a retention-flange distal to the bearing-surface engaging the plurality of keyways, the retention-flange being able to prevent the plurality of bearing-fins from moving radially outward from within the plurality of keyways, a concavity disposed within the retention-flange, the concavity being semi-circular, the concavity traversing an entire length of the retention-flange, and a fin-threading integrated into the concavity;

a plurality of adjustment-screws corresponding to the plurality of bearing-fins disposed within the plurality of screw-apertures, the plurality of adjustment-screws protrude from the center-end and are sized to freely turn within the plurality of screw-apertures, the plurality of adjustment-screws being in engagement with the fin-threading of the plurality of bearing-fins such that turning one of the plurality of adjustment-screws causes a corresponding one of the plurality of bearing-fins to slide linearly within the corresponding one of the plurality of keyways, the plurality of adjustment-screws each having a drive-axis, the drive-axis being neither parallel nor normal to a respective bearing-surface of the plurality of bearing-fins in order to enable the bearing-surface of each of the plurality of bearing-fins to function as a translating inclined plane against the hollow of the workpiece, such that the workpiece-axis of the workpiece is displaced laterally relative to the shaft-axis as any one of the plurality of bearing-fins slides linearly within the corresponding one of the plurality of keyways; and a plurality of screw-retainers corresponding to the plurality of adjustment-screws affixed to the center-base, within a recess thereof, over the plurality of screw-apertures, such that each one of the plurality of screw-retainers covers one each of the plurality of screw-apertures, the plurality of screw-retainers preventing the plurality of adjustment-screws from leaving the plurality of screw-apertures, wherein each of the plurality of screw-retainers comprises a flat plate having a semi-circular relief that engages a respective one of the plurality of adjustment-screws such that an end of each of the plurality of power screws adjustment-screws is exposed.

2. The lathe-center of claim 1, wherein the shaft has a machine-taper configured to mate with a machine-tapered chuck.

3. The lathe-center of claim 1, wherein the plurality of bearing-fins is constructed from hardened tool-steel.

4. The lathe-center of claim 1, wherein the lathe-center further includes a bearing coupling the shaft to the center-head, the bearing enabling the shaft to spin freely relative to the center-head, the bearing being disposed within and concentric to the center-base of the center-head.

5. The lathe-center of claim 1, wherein each of the plurality of screw-apertures are non-threaded and cylindrical, the apertures being configured to allow the plurality of adjustment-screws to freely spin within the plurality of screw-apertures.

6. The lathe-center of claim 1, wherein each of the plurality of screw-retainers include at least one retainer-aperture and at least one retainer-screw, the at least one retainer-screw being dimensioned to pass through the at least one retainer-aperture into the center-base, such that the plurality of screw-retainers is releasably affixed to the center-head.

7. The lathe-center of claim 6, wherein the center-head further includes a plurality of base-apertures disposed within the center-base, the plurality of base-apertures being dimensioned and threaded to releasably accept the at least one retainer-screw.

8. The lathe-center of claim 6, wherein each of the at least one retainer-screw has a retainer-screw axis along which the at least one retainer-screw respectively rotates, the retainer-screw axis being parallel to each of the plurality of adjustment-screws.

9. The lathe-center of claim 1, wherein each of the plurality of power screws adjustment-screws may be engaged by a drive tool while being retained by the plurality of screw-retainers, the semi-circular relief being respectively aligned and respectively concentric to the plurality of adjustment-screws.

10. The lathe-center of claim 1, wherein the plurality of adjustment-screws are hex-drive screws, each having a hexagonal aperture concentric to the drive axis, the hex-drive screws configured to accept a hex-drive tool.

11. The lathe-center of claim 1, wherein the plurality of adjustment-screws are hexalobular-drive screws, each having a hexalobular-internal aperture concentric to the drive axis, the hexalobular-drive screws configured to accept a hexalobular-drive tool.

12. The lathe-center of claim 6, wherein the at least one retainer-screw of the plurality of screw-retainers comprises at least one hex-drive screw having a hexagonal aperture concentric to a respective retainer-screw axis of the at least one retainer screw, the at least one hex-drive screw configured to accept a hex-drive tool.

13. A lathe-center for a workpiece having a hollow and a workpiece-axis, the lathe-center comprising:

a shaft having a shaft-axis, the shaft configured to releasably couple with a lathe-spindle;

a center-head fixed to the shaft, the center-head configured to fit within the hollow of the workpiece, the center-head including a center-base proximal to and concentric with the shaft, the center-base being circular and having a base-diameter, a center-end distal to and concentric with the shaft, the center-end being flat and circular with an end-diameter, the end-diameter being smaller than the base-diameter, a conical sidewall extending between the center-base and the center-end, a plurality of screw-apertures extending from the center-base to the center-end, wherein each of the plurality of screw-apertures are disposed parallel to the conical sidewall, and a plurality of keyways recessed into the conical sidewall;

a plurality of bearing-fins respectively disposed within the plurality of keyways, the plurality of bearing-fins being able to slide within the plurality of keyways, each of the plurality of bearing-fins having a bearing-surface disposed distal to the center-head configured to engage the hollow of the workpiece, the bearing-surface being neither parallel nor normal to the shaft-axis, the bearing-surface having a convex surface-curvature structured and arranged to mate with the hollow of the workpiece, a retention-flange distal to the bearing-surface engaging the plurality of keyways, the retention-flange being able to prevent the plurality of bearing-fins from moving radially outward from within the plurality of keyways, a concavity disposed within the retention-flange, the concavity being semi-circular, the concavity traversing an entire length of the retention-flange, and a fin-threading integrated into the concavity;

a plurality of adjustment-screws corresponding to the plurality of bearing-fins disposed within the plurality of screw-apertures, the plurality of adjustment-screws protrude from the center-end and are sized to freely turn within the plurality of screw-apertures, the plurality of adjustment-screws being in engagement with the fin-threading of the plurality of bearing-fins such that turning one of the plurality of adjustment-screws causes a corresponding one of the plurality of bearing-fins to slide linearly within the corresponding one of the plurality of keyways, the plurality of adjustment-screws each having a drive-axis, the drive-axis being neither parallel nor normal to a respective bearing-surface of the plurality of bearing-fins in order to enable the bearing-surface of each of the plurality of bearing-fins to function as a translating inclined plane against the hollow of the workpiece, such that the workpiece-axis of the workpiece is displaced laterally relative to the shaft-axis as any one of the plurality of bearing-fins slides linearly within the corresponding one of the plurality of keyways; and a plurality of screw-retainers corresponding to the plurality of adjustment-screws affixed to the center-base, within a recess thereof, over the plurality of screw-apertures, such that each one of the plurality of screw-retainers covers one each of the plurality of screw-apertures, the plurality of screw-retainers preventing the plurality of adjustment-screws from leaving the plurality of screw-apertures, wherein each of the plurality of screw-retainers comprises a flat plate having a semi-circular relief that engages a respective one of the plurality of adjustment-screws such that an end of each of the plurality of power screws adjustment-screws is exposed;

wherein the shaft has a machine-taper configured to mate with a machine-tapered chuck;

wherein the plurality of bearing-fins is constructed from hardened tool-steel;

wherein the lathe-center further includes a bearing coupling the shaft to the center-head, the bearing enabling the shaft to spin freely relative to the center-head, the bearing being disposed within and concentric to the center-base of the center-head;

wherein each of the plurality of screw-apertures are non-threaded and cylindrical, the apertures being configured to allow the plurality of adjustment-screws to freely spin within the plurality of screw-apertures;

wherein each of the plurality of screw-retainers include at least one retainer-aperture and at least one retainer-screw, the at least one retainer-screw being dimensioned to pass through the at least one retainer-aperture into the center-base, such that the plurality of screw-retainers is releasably affixed to the center-head;

wherein the center-head further includes a plurality of base-apertures disposed within the center-base, the plurality of base-apertures being dimensioned and threaded to releasably accept the at least one retainer-screw;

wherein each of the at least one retainer-screws has a retainer-screw axis along which the at least one retainer-screws-respectively rotates, the retainer-screw axis being parallel to each of the plurality of adjustment-screws;

wherein each of the plurality of power screws adjustment-screws may be engaged by a drive tool while being retained by the plurality of screw-retainers, the semi-circular relief being respectively aligned and respectively concentric to the plurality of adjustment-screws.

* * * * *